United States Patent [19]

Nijhawan et al.

[11] Patent Number: 4,840,857
[45] Date of Patent: Jun. 20, 1989

[54] GALVANIC PRIMARY ELEMENT WITH NEGATIVE LITHIUM ELECTRODE

[75] Inventors: Subash-Chander Nijhawan, Kronberg; Horst Daniel, Hofheim; Welf Dennstedt, Kelkheim, all of Fed. Rep. of Germany

[73] Assignee: Varta Batterie Aktiengesellschaft, Hanover, Fed. Rep. of Germany

[21] Appl. No.: 187,284

[22] Filed: Apr. 28, 1988

[30] Foreign Application Priority Data

May 2, 1987 [DE] Fed. Rep. of Germany ....... 3714655

[51] Int. Cl.$^4$ ............................................. H01M 6/16
[52] U.S. Cl. .................................... 429/197; 429/218; 429/247
[58] Field of Search ............... 429/194, 196, 197, 218, 429/247

[56] References Cited

U.S. PATENT DOCUMENTS 3,567,515 3/1971 Maricle et al. ................. 429/218 X
3,926,669 12/1975 Auborn .............................. 429/196
4,049,890 9/1977 Schneider ........................... 429/181

*Primary Examiner*—Anthony Skapars
*Attorney, Agent, or Firm*—Weiser & Stapler

[57] ABSTRACT

There are provided primary cells comprising a negative lithium electrode and a positive $CrO_x$ cathode wherein $2 \leq X \leq 2.9$. These cells are devoid of the conventional separator between the electrodes. Instead, there is provided at the outer face of the chromium oxide electrode, a barrier layer formed by the reaction of lithium and chromium oxide. The exact constitution of this barrier layer is not known. The barrier layer is ion conductive but not electro-conductive and has a substantially lower ohmic resistance than the conventional polypropylene or paper separators. There is thus provided a cell of high current capacity. Such cells can also be constructed utilizing magnesium dioxide, silver monoxide and disilver oxide or nickel hydroxide provided that said metal oxie cathodes are coated with a covering of chromium oxide.

10 Claims, 1 Drawing Sheet

GALVANIC PRIMARY ELEMENT WITH NEGATIVE LITHIUM ELECTRODE

FIELD OF THE INVENTION

The invention concerns a galvanic primary element comprising a negative lithium electrode and a $CrO_x$ containing positive electrode, wherein $2.0 < X < 2.9$ and further comprising a non-aqueous electrolyte.

BACKGROUND OF THE INVENTION

Lithium/$CrO_x$ cells of the general type mentioned above are known from German Patent DE No. 24 26 380. In the commercially available embodiment as a cylindrical cell such a cell comprises a pair of $CrO_x$ rings pressed into a nickel-plated steel cup, having a diameter of 14.8 millimeters and a height of 50.5 millimeters. The remaining cylindrical volume comprises a lithium rope provided with a peg takeoff surrounded by a separator sheath. The separator further encloses the electrolyte which, conventionally, is a mixture of propylene carbonate and dimethoxyethane in which lithium perchlorate is dissolved as the conductive agent.

The are of utility of the invention is not limited to the aforementioned type of cell but includes other lithium organic systems with metal oxide cathodes for example, which contains only a portion of $CrO_x$ and which are made substantially of manganese dioxide, silver monoxide, disilver oxide, or nickel hydroxide. The $CrO_x$ may be provided as a coating layer pressed on to a carrier base of the aforesaid metal oxides.

The compact construction of the active components in such a cell emphasizes not only the desired properties provided by the separator such as assurance against short circuits between the electrodes, but equally, certain disadvantages are also emphasized. Thus, in view of the ultimate resistance value of the separator, there is provided a barrier to the passage of an ionic current which thus reduces the capacity of the cell. In order to overcome these problems, provision must be made for increasing the porosity of the separator which in turn increases the cost factor for this component. Furthermore, because of the rather tight space constraints between string-formed lithium anode and the ring cathode, the separator can interfere in the necessary exchange between electrolyte and gas bubbles which occasionally leads to disruptions during the discharge of the cell.

It is known that it is not always unequivocally necessary to prevent all direct contact between an anode and the cathode depolarizer in an electrochemical cell, since certain cathodic substances, at least in the preferred circuit, do not necessarily enter into a chemical reaction with an adjacent active metal anode. In such instances, it is noted that the metal anode is caused to be merely covered by a thin film comprising an insoluble reaction product between the anode and the cathode, said film being of unspecified composition, which on the one hand does not exceed the thickness of a passivating film, but on the other hand, does not substantially effect the chargeability or dischargeability of the anodic metal.

A lithium cell of this type utilizing sulfur dioxide as the cathode depolarizer in which, for reasons similar to those set forth above, a conventional separator may be omitted, is disclosed in U.S. Pat. No. 3,567,515. In this case the upper surface of the lithium is converted into a sheath of lithium dithionite as a discharge product, which takes on the separator function.

In accordance with U.S. Pat. No. 3,926,669, lithium is also noted to be stable in an electrochemical cell wherein oxyhalides and thiohalides, in particular thionyl chloride are utilized as depolarizing agents. It is further disclosed in U.S. Pat. No. 4,049,890 that in a lithium iodide solid phase cell the separator is created in situ from an ion conductive lithium iodide interface, which at the same time serves as the electrolyte.

It would therefore be desirable to formulate a galvanic primary element of the lithium/$CrO_x$ type in which the disadvantages associated with conventional separators made out of polypropylene or paper can be substantially avoided.

SUMMARY OF THE INVENTION

It has been our surprising finding that operable lithium/metal oxide cells may be made, which utilize as the positive electrode at least an outer layer of $CrO_x$ or other metal oxide carriers, in the presence of organic electrolytes, without the necessity for interposition of a separator. This is possible because the contact between lithium and the metal oxide electrode does not lead to an electronically conductive bridge, but rather as a result of a reaction of the $CrO_x$ there is formed an ionically conductive separating film.

BRIEF DESCRIPTION OF THE DRAWINGS

The figure shows an elevational cross-sectional view of the device of the present invention.

DETAILED DESCRIPTION OF THE DRAWINGS

Figure 1:
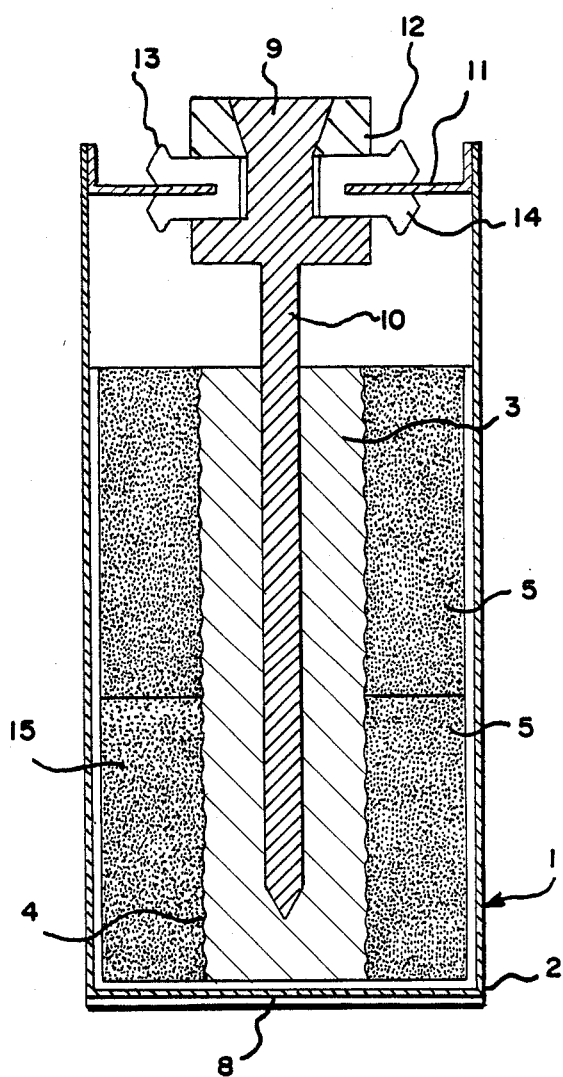

As shown in FIG. 1, the device 1 of the present invention comprises an annular cylindrical metallic housing cup 2 suitably of stainless steel. Within this housing are located cathode rings 5 which serve as the positive electrode made of compacted metal oxide powders which comprise at least a coating of $CrO_x$. Internally of this annular cylinder and in contact therewith is provided a lithium rope anode 3.

An insulating layer 8 separates all of the internal components of the cell from the metal base of the outer metallic cup 2.

The negative conductor is provided by rod 9 preferably a stainless steel rod which is inserted into the lithium rope 3. A lid 7 closes the upper opening of metallic cup 2, the pole rod 9 passes through an opening in the said lid 11 to which it is attached by rivet ring nut 12 to form the negative pole of the cell. To ensure that there is no electrical contact between the pole 8 and nut 12 on the one hand and the lid 7 on the other, there are provided sealing, suitably insulating means 13 between the upper bottom surface and the vertical side surfaces of pole 8 and lid 7 and insulating disc 14 located between ring 12 and lid 7, both 13 and 12 being suitably PTFE. Any other alkali and high temperature proof synthetic material such as polyether ketones may be utilized.

Electrolyte 15 comprises suitably propylene carbonate in dimethoxyethane in which lithium perchlorate is dissolved. In the preferred embodiment the lid 7 is hermetically sealed to the outer metallic housing 2 by means of laser welding.

TEST RESULTS

Fifty Li/$CrO_x$ cells were built in accordance with the conventional design containing a separator between the positive and negative poles and further fifty were built in accordance with the construction of the present invention. These cells were constructed in the conventional ER-AA type. However, in the cells without separators no effort was made during assembly to ensure lack of contact between the cathode rings and the lithium rope. All cells in open circuit provided 3.8 volts. The cells were tested when fresh, after forty days, and after ninety days. The potential delivered was tested for two seconds under a load operating across a 180 ohm resistance. The internal resistance under the same conditions was also measured and finally, the capacity in milliamp hours was measured under a load of 1 kilo ohm. The results are set forth in Table I below:

TABLE I

VALUES MEASURED IN THE CELL

| | With Separator | Without Separator | Difference in Performance Relative to "With Separator" |
|---|---|---|---|
| | FRESH | | |
| $U_o$ (V) | 3,89 | 3,89 | |
| $U_b$ (V) | 3,30 | 3,54 | |
| $R_i$ (Ω) | 32 | 18 | −44% |
| Cap (mAh) | 2250 | 2550 | +13% |
| | AFTER FORTY DAYS 60° C. | | |
| $U_o$ (V) | 3,88 | 3,88 | |
| $U_b$ (V) | 2,60 | 2,80 | |
| $R_i$ (Ω) | 90 | 70 | −22% |
| Cap (mAh) | 2200 | 2530 | −15% |
| | AFTER NINETY DAYS 60° C. | | |
| $U_o$ (V) | 3,88 | 3,88 | |
| $U_b$ (V) | 2,60 | 2,90 | |
| $R_i$ (Ω) | 90 | 60 | −33% |
| Cap (mAh) | 2175 | 2440 | +12% |

$U_o$ (V) = open circuit potential
$U_b$ (V) = potential under load of 180 ohms for 2 seconds
$R_i$ (Ω) = inner resistance under load of 180 ohms for 2 seconds
Cap (mAh) = under load of one kilo ohm discharge capacity.

In accordance with the foregoing figures, it will be seen that the cells which do not have a separator have a lower inner resistance and therefore, a better load capability and higher capacity than cells with separators. The foregoing results are valid both for the fresh cells as well as those that have been stored at elevated temperatures.

Further, in accordance with the above results, it is seen that it is possible to build Li/CrO$_x$ type cylindrical cells with closely constructed cylindrical electrodes without separators and to put these into operation. It is doubtful whether short circuits occur and if they do, they only occur for a very brief time which causes a totally negligible degree of discharge.

The foregoing tests show that cylindrical cells without the interposition of a separator may be readily produced utilizing metal oxide cathodes with chromium oxide. It should be noted that the invention is not limited to cathodes made only of pure active components. It was further demonstrated that ionic conductance occurs not only with pure CrO$_x$ but also that the contact layer formed from the fresh or even partially discharged CrO$_x$ in this process provides an ionically conductive separator.

In order to test this thesis a metallic cup was provided with two concentric pressed rings of CrO$_x$ encompassing a lithium rope having a conductive pin, but comprising neither separator or electrolyte. A maximum potential of 2.3 volts was set up which remained for over three hours. This can be measured under high resistance (R = 1,000 M ohms) however, this cell was not capable of delivering power. The generation of electro-motive force, however does show that where the two components are in mutual contact without the presence of electrolyte, an electrochemical element is created at the contact point. After provision of a drop of electrolyte (propylene carbonate, dimethoxyethane, lithium perchlorate), which distributed itself between the lithium and the CrO$_x$ rings, the potential rose to 3.6 volts. The fact that an ionically conductive reaction product is formed in the contact zone between CrO$_x$ and the lithium is also demonstrated by the fact that no short circuit occurs. It should be noted that the removal of the conventional separator also removes the internal resistance due to it and thus the capacity and load delivery capability of the new cells as shown in FIG. I, are considerably improved.

We claim:

1. In a galvanic primary element having a negative lithium electrode and a positive metal oxide electrode comprising CrO$_x$ wherein $2 \leq x \leq 2.9$ and a non-aqueous electrolyte the improvement comprising:
   interposing, as the sole barrier between said electrodes, an electronically non-conductive but lithium ion permeable layer comprising the reaction product of lithium and CrO$_x$.

2. An element in accordance with claim 1 wherein the positive electrode comprises at least one substantially annular cylinder of at least one metal oxide selected from the group consisting of manganese dioxide, silver monoxide, disilver oxide, nickel hydroxide, and CrO$_x$, provided that where only one metal oxide is used it shall be CrO$_x$.

3. An element in accordance with claim 2 wherein the oxide is CrO$_x$.

4. An element in accordance with claim 2 wherein the cylinder comprises CrO$_x$ coated on at least one other metal oxide.

5. An element in accordance with claim 1 wherein the metal oxide electrode comprises metal oxides compressed into the desired form.

6. An element in accordance with claim 2 wherein the electrolyte comprises dimethoxyethane and polypropylene carbonate.

7. An element in accordance with claim 6 wherein the electrolyte further comprises lithium perchlorate.

8. An element in accordance with claim 1 wherein the anode is a lithium rope anode.

9. An element in accordance with claim 1 wherein the anode takeoff is a stainless steel post.

10. An element in accordance with claim 1 wherein the outer housing of the cell is a stainless steel cup.

* * * * *